United States Patent [19]

Shiratani et al.

[11] Patent Number: 4,830,518
[45] Date of Patent: May 16, 1989

[54] SEALED CYLINDRICAL ROLLER BEARING

[75] Inventors: Takaaki Shiratani, Tokyo; Hiroshi Suzuki, Yokohama; Moichi Chiba, Yokosuka, all of Japan

[73] Assignee: Nippon Seiki Kabushiki Kaisha, Tokyo, Japan

[21] Appl. No.: 192,336

[22] Filed: May 9, 1988

[30] Foreign Application Priority Data

May 7, 1987 [JP] Japan .............................. 62-68152[U]
Jun. 23, 1987 [JP] Japan .............................. 62-96337[U]

[51] Int. Cl.$^4$ ............................................. F16C 41/04
[52] U.S. Cl. .................................... 384/448; 384/482; 384/480; 277/95
[58] Field of Search ............... 384/448, 480, 482, 140, 384/144, 569, 564; 277/95

[56] References Cited

U.S. PATENT DOCUMENTS

| | | | |
|---|---|---|---|
| 3,572,857 | 3/1971 | Hasegawa | 384/482 |
| 3,642,335 | 2/1972 | Takahashi et al. | 384/482 |
| 3,870,384 | 3/1975 | Ladin | 277/95 |
| 4,780,003 | 10/1988 | Bauer et al. | 384/448 |

FOREIGN PATENT DOCUMENTS 60-93015 6/1985 Japan .

Primary Examiner—Lenard A. Footland
Attorney, Agent, or Firm—Basile and Hanlon

[57] ABSTRACT

A seal plate for sealing the axial end opening between the outer ring and the inner ring of a cylindrical roller bearing includes a mandrelor core. The mandrel has a fixing portion at the peripheral part to be fitted to the outer ring, a slant portion protruding obliquely and outwardly, an intermediate portion extending from the slant portion perpendicularly to the axis, and bent portion protruding inwardly in the axial direction from the inner edge of the intermediate portion. A lip portion formed of an elastic member is bonded to the bent portion to extend in the opposite direction to the fixing portion. In the cylindrical outside surface of the flange of the inner ring, there is a step-formed portion in two steps at a position facing the bent portion and the lip portion of the mandrel of the seal plate. The bent portion is positioned close to a cutout surface (step surface) and an end face of the first step with a minute axial and a minute radial clearance to form a non-contact type sealing portion, and the inner edge of the lip portion is positioned slidingly in contact with a cutout surface of the second step to form a contact type sealing portion.

32 Claims, 5 Drawing Sheets

SEALED CYLINDRICAL ROLLER BEARING

BACKGROUND OF THE INVENTION

1. Field of the Invention

The present invention relates to a sealed nonseparable cylindrical roller bearing, and in particular, to a sealed cylindrical roller bearing with improved sealing characteristics.

2. Description of the Prior Art

A prior art non-separable cylindrical roller bearing of this type is disclosed, for example, in Japanese Utility Model Laid-Open Publication No. 60-93015. This bearing, as shown in FIG. 1, includes an outer ring 1 having flanges 1a at opposite axial ends and serving as a raceway ring. An inner ring 2 includes a raceway ring 3 having a flange 3a at one axial end and includes a flange ring 4 in contact with an end face of a cylindrical roller 5. A seal plate 6 is fitted into a circular groove 1b at an axial end of the outer ring. The seal plate 6 includes a mandrel or core 7, and the inside end portion of the mandrel 7 is bent obliquely and inwardly, and an inside lip 8 extending inwardly in the axial direction from the inner edge of the mandrel 7 is slidingly in contact with an end face 4a of a step-formed portion of the flange ring 4. An outside lip 9 which extends from the inner edge of the mandrel 7 at right angles obliquely and outwardly in the axial direction is slidingly in contact with a cutout surface 4b at the step-formed portion of the flange ring 4.

In the cylindrical roller bearing described above, a problem arises in that when the flange ring 4 moves in the axial direction and in the radial direction during transportation, imparting an external force or shock to the inside lip 8 and outside lip 9 of the seal plate 6 by the flange ring 4, the inside lip 8 and outside lip 9 are damaged or worn and subjected to plastic deformation by the external force. As a result, the sealing function of the seal plate during use is impeded.

For this reason, it is necessary to secure the flange ring 4 against movement during transportation by using a special jig, which requires a great amount of labor and time to attach and remove.

SUMMARY OF THE INVENTION

It is an object of the present invention to provide a cylindrical roller bearing which solves the problem in the prior art and prevents the lips of the seal plate from being subjected to external force or shock during transportation without using a fixing jig.

In a sealed cylindrical roller bearing according to the present invention, one of the outer or inner rings includes the combination of a raceway ring and at least one flange ring. The raceway ring may include a no-flange raceway ring and two flange rings, or a single-flanged raceway ring and one flange ring. A seal plate is attached to either the outer ring or the inner ring.

The seal plate includes a mandrel or core and a lip portion formed of an elastic member bonded to the mandrel integrally. The mandrel includes a fixing portion, a slant portion extending from the fixing portion and being bent outwardly in the axial direction, an intermediate portion extending perpendicularly toward the axis, and a bent portion extending from the intermediate portion and being bent inwardly in the axial direction. A lip portion extends from the axially outside part of the bent portion opposite to the tip portion thereof in the opposite direction to the fixing portion.

The fixing portion of the mandrel of the seal plate is fixed to either the outer or inner ring. The bent portion of the mandrel is positioned close to an end face of a first step of a step-formed portion with a minute axial clearance, and to a cutout surface of the step-formed portion with a minute radial clearance. The end face and the cutout surface of the step-formed portion are formed on at least one axial end of the flange of the single-flanged raceway ring and the flange ring combined with the former of the inner ring or the outer ring. Alternatively, the end face and the cutout surface are formed on at least one axial end of the no-flange raceway ring and the flange ring combined with the former. The side face of the extreme end of the lip portion of the seal plate is slidingly in contact with an end face of a second step formed in the above-mentioned axial end so that the end face of the second step extends downwardly from the axial outside edge of the cutout surface of the first step.

It is preferable to provide the seal plate with an auxiliary lip portion of an elastic member which is bonded to the inner surface of the bent portion at the opposite side with respect to the lip portion. The auxiliary lip portion extends inwardly in the axial direction beyond the tip of the bent portion. The auxiliary lip portion is positioned with a minute clearance close to a cylindrical outside surface or a cylindrical inside surface of at least one flange of the single-flanged raceway ring and the flange ring combined with the former, or a cylindrical outside surface or a cylindrical inside surface of at least one of the no-flange raceway ring and the flange ring combined with the former.

Furthermore, it is preferable to coat an elastic member on the surface of the tip portion of the bent portion and on the peripheral surface of the lip portion of the mandrel of the seal plate.

Alternatively, the seal plate may include a mandrel or core having a fixing portion, a slant portion extending from the fixing portion and being bent axially and outwardly, and a circular ring portion extending from the slant portion toward the axis. A lip portion of an elastic member is bonded to an axial inside surface and the lip portion is extended in the opposite direction to the fixing portion with a space interposed between the lip portion and the inside surface of the circular ring portion.

In this seal plate, when the fixing portion of the mandrel is fixed to the outer ring or the inner ring, the inner side face of the tip portion of the lip portion is slidingly in contact with an end face rising from a first step formed in an axial end of at least one flange of the single-flanged raceway ring and the flange ring combined with the former, or in an axial end of at least one of the no-flange raceway ring and the flange ring combined with the former. The inner edge portion of the circular ring portion is positioned close with a minute axial clearance to an end face of a second step formed contiguous to and axially outside of the end face of the first step and with a minute radial clearance to a cutout surface of a step-formed portion at the above-mentioned axial end.

It is preferable that the axial inside surface the inner edge face of the inner edge portion of the circular ring portion of the mandrel of the seal plate are coated with an elastic member.

Furthermore, it is preferable that the whole surface of the fixing portion of the mandrel of the seal plate is coated with the elastic member.

In the sealed cylindrical roller bearing of the present invention, when the single-flanged raceway ring or the flange ring is moved in the axial direction and in the radial direction during transportation of the bearing, the bent portion of the mandrel of the seal plate is brought into contact with the end face and the cutout surface of the first step of the single-flanged raceway ring. Alternatively, the circular ring portion of the mandrel of the seal plate is brought into contact with the end face and the cutout surface of the second step of the single-flanged raceway ring or the flange ring. Thus, the raceway ring with the flange at one side or the flange ring is supported to stop the movement thereof. As a result, the lip portion of the seal plate is not subjected to a large external force or shock due to the movement of the single-flanged raceway ring or the flange ring.

The bent portion of the mandrel of the seal plate is positioned close to the end face and the cutout surface of the first step of the single-flanged raceway ring or the flange ring with respectively minute clearances. Alternatively, the circular ring portion of the mandrel of the seal plate is positioned close to the end face and the cutout surface of the second step of the single-flanged raceway ring or the flange ring with respectively minute clearances. Accordingly, a non-contact type sealing function can be provided.

Furthermore, the circular ring portion of the mandrel of the seal plate including the slant portion, intermediate portion, and bent portion, or the circular ring portion of the mandrel of the seal plate including the slant portion, circular ring portion, and lip portion of the elastic member serves as a space for retaining a lubricating oil such as grease which is pushed out from the raceway surface by the roller during use of the bearing.

Moreover, the auxiliary lip bonded on the inner surface of the bent portion opposite to the lip portion introduces the lubricating oil between the end face of the cylindrical roller and the guide surface of the raceway ring having the flange at one side or the flange ring.

Foreign substances which intrude from the outside by centrifugal force are stored in a space formed between the lip portion bonded on the axial inside surface of the circular ring portion and the circular ring portion of the mandrel of the seal plate.

The elastic member coated on the tip surface of the bent portion and on the peripheral surface of the lip portion, or the elastic member coated on the axial inside surface and the inner edge face of the inner edge portion of the circular ring portion of the mandrel of the seal plate prevents wear when the single-flanged raceway ring or the flange ring moves in the axial and radial directions to contact the mandrel.

In addition, the elastic member coated on the whole surface of the fixing portion seals the fixing portion of the seal member with respect to the outer ring or the inner ring perfectly.

DESCRIPTION OF THE PREFERRED EMBODIMENTS

Figure 1:
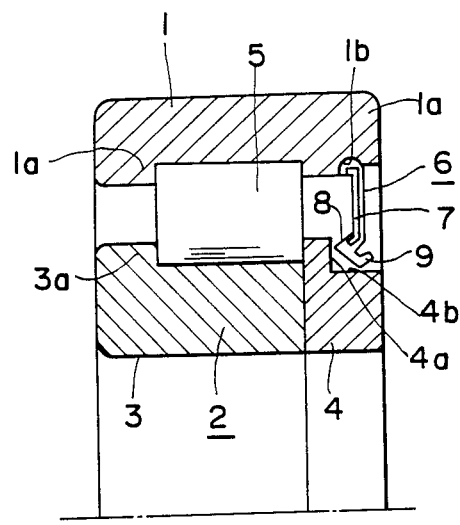
FIG. 1 is a longitudinal sectional view of an upper half portion of a prior art non-separable type cylindrical roller bearing with a seal.
Figure 2:
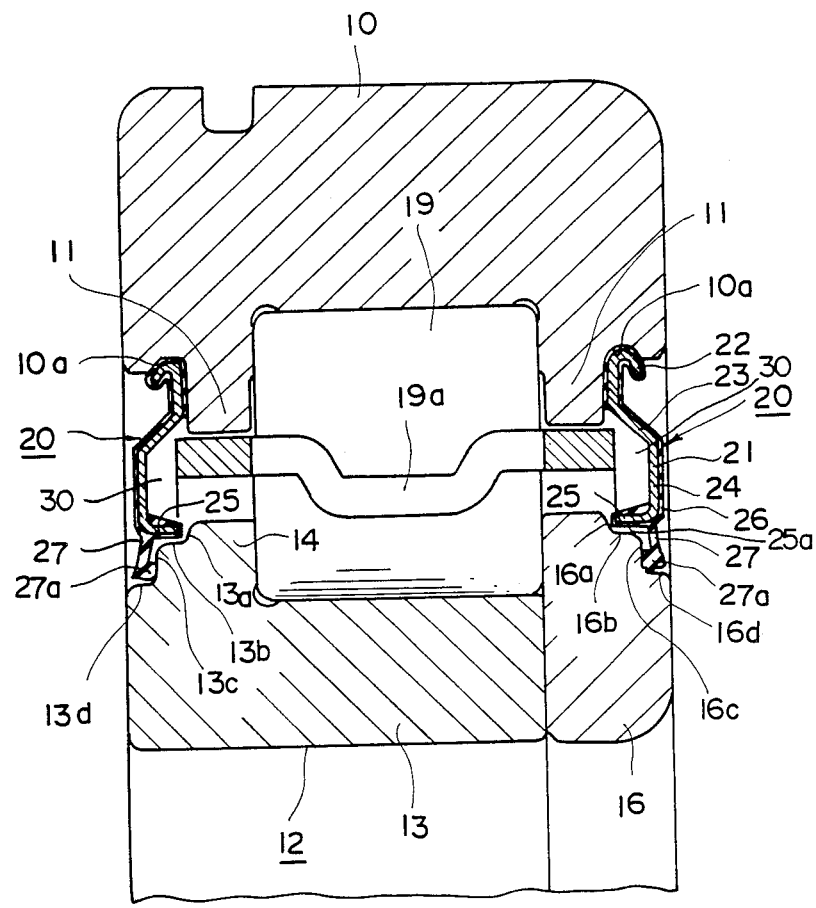
FIG. 2 is a longitudinal sectional view of an upper half portion of a sealed cylindrical roller bearing of an embodiment of the present invention.

FIG. 2 is a longitudinal sectional view of an upper half portion showing a first embodiment of the invention.

An outer ring 10 is a raceway ring with both flanges having flanges 11 at axial opposite ends thereof, and circular grooves 10a are respectively formed in inner surfaces of circular openings at axial opposite ends for fitting therein to a seal plate which will be described later.

An inner ring 12 is constituted by a combination of a single-flanged raceway ring 13 having a flange 14 at one axial end and a flange ring 16 which is assembled to the other axial end. In the cylindrical outside surface of the flange 14 of the single-flanged raceway ring 13, there are formed at the axial end side thereof from the inside toward the outside in the axial direction with an upper cutout surface 13b and a lower cutout surface 13d in two upper and lower steps by reducing the outer diameter. An end face 13a of the first step, that is, of the upper cutout surface 13b rises from the upper cutout step 13b, and an end face 13c of the second step, that is, of the lower cutout surface 13d rises from the lower cutout surface 13d and connects the first and the second steps. Similarly, in the cylindrical outside surface of the flange ring 16, there are formed an upper cutout surface 16b and a lower cutout surface 16d in two upper and lower steps by reducing the outer diameter of the flange ring 16 through an end face 16a of the first step and through an end face 16c of the second step.

Between the outer ring 10 and the inner ring 12, there are interposed a plurality of cylindrical rollers 19 which roll by being retained and guided by a retainer 19a. The opposite axial ends are sealed by seal plates 20 respectively fitted into the inner circular grooves 10a of the outer rings 10, and a lubricant such as grease or the like is filled in the inside of the bearing.

The seal plate 20 is made up of a mandrel or core 21 and an elastic member 26 such as a rubber or the like bonded to the mandrel 21 integrally thereto. A fixing portion 22 is formed at the peripheral part of the mandrel 21 by curving outwardly in the axial direction. A slant portion 23 is bent and extended from the inner circular edge of the fixing portion 22 obliquely and outwardly toward the axis, and then an intermediate portion 24 having a circular ring shape is formed which extends from the slant portion 23 perpendicularly toward the axis. A bent portion 25 is bent and extended from the inner edge of the intermediate portion 24 inwardly in the axial direction at about right angles.

The elastic member 26 of the seal plate 20 is bonded to cover both surfaces of the fixing portion 22, and the outer surface of the slant portion 23 and the intermediate portion 24 are also coated with the elastic member 26. The surface of the tip portion and the outer and the inner surfaces of the bent portion 25 are coated with the elastic member 26. A lip portion 27 extends toward the axis (downwardly in the Figure) from the outer surface of the bent portion 25 starting from a portion axially outside with respect to the tip of the bent portion 25. A tip portion 27a of the lip portion 27 has a thicker wall than that of the extending portion of the bent portion 25.

The seal plate 20 is fixed to the outer ring 10 with the fixing portion 22 of the mandrel 21 fitted by caulking into the circular groove 10a formed at each side of the right and left sides of the outer ring 10.

The seal plate 20 fixed to the left axial end of the outer ring 10 has the tip surface of the bent portion 25 positioned close with a minute axial clearance to the end surface 13a of the first step of the single-flanged raceway ring 13, and has the outer peripheral surface (near the axis in the Figure) of the bent portion 25 positioned close with a minute radial clearance to the cutout surface 13b of the first step, thereby forming, sealing portion of the non-contact type.

Furthermore, an axial inside surface of the tip portion 27a of the lip portion 27 is slidingly in contact with the end face 13c of the second step thereby forming a sealing portion of the contact type.

In the seal plate 20 fixed to the right axial end of the outer ring 10, similarly, the tip surface and the outer peripheral surface of the bent portion 25 are positioned respectively close to the end face 16a and the cutout surface 16b of the first step of the flange ring 16, thereby forming a sealing portion of the non-contact type. Furthermore, the axial inside surface of the tip portion 27a of the lip portion 27 is slidingly in contact with the end face 16c of the second step thereby forming a sealing portion of the contact type.

In the cylindrical roller bearing configured as described above, when the single-flanged raceway ring 13 or the flange ring 16 is moved in the axial direction, the end face 13a of the first step of the single-flanged raceway ring 13, or the end face 16a of the first step of the flange ring 16 abuts against the tip surface of the bent portion 25 of the mandrel 21 of the corresponding seal plate 20. On the other hand, when the single-flanged raceway ring 13 or the flange ring 16 is moved in the radial direction, the cutout surface 13b of the first step of the single-flanged raceway ring 13, or the cutout surface 16b of the first step of the flange ring 16 abuts against the inner peripheral surface 25a (near the axis in the Figure) of the bent portion 25 of the mandrel 21 of the seal plate 20.

Since the bent portion 25 of the mandrel 21 of the seal plate 20 is formed by bending the inner circular edge portion of the mandrel 21 inwardly in the axial direction, the bending rigidity of this portion is very high, and this portion will never be deformed even when the external force is imparted by the single-flanged raceway ring 13 or the flange ring 16. Accordingly, the single-flanged raceway ring 13 or the flange ring 16 is supported by the bent portion 25 of the mandrel 21 in the axial direction and in the radial direction, and the movement of the raceway ring 13 or the flange ring 16 in the axial and radial directions exceeding the clearances with respect to the bent portion of the mandrel 21 of the seal plate 20 can be interrupted.

In the cylindrical roller bearing having the seal plates 20 assembled thereto, since the bent portions 25 of the mandrels 21 of the seal plates 20 form respectively the sealing portions of the non-contact type in association with the end faces 13a and 16a and the cutout surfaces 13b and 16b of the first step, the lubricant such as grease or the like filled in the inside of the bearing is prevented from being leaked to the outside of the bearing.

Furthermore, since the lip portions 27 of the seal plates 20 form the contact type sealing portions by their tip portions 27a in association with the end faces 13c and 16c of the second step of the single-flanged raceway ring 13 and the flange ring 16, the intrusion of foreign substances from the outside of the bearing is prevented. The tip portions 27a of the lip portions 27 are respectively slidingly in contact with the end faces 13c and 16c of the second step of the single-flanged raceway ring 13 and the flange ring 16. As a result, it is possible to prevent the degradation of the sealing property due to the reversal of the tip portions 27a of the lip portions 27 when the seal plates 20 are assembled.

Furthermore, since the seal plates 20 are assembled so that they do not protrude outwardly in the axial direction beyond the external surfaces of the bearing, no interference is caused between the bearing and other components even when such components are assembled thereto.

Since the lip portion 27 of the seal plate 20 has a thinner wall at the extending portion than the tip portion 27a, the lip portion 27 is flexible, and it is possible to easily follow the movement in the axial direction. As a result, a change in the contact pressure of the tip portion 27a of the lip portion 27 of the seal plate 20 is small, and the sealing property is not degraded.

Moreover, in the seal plate 30 in the embodiment, an annular portion surrounded on most sides by the slant portion 23, intermediate portion 24, and bent portion 25 forms a space 30 for retaining the grease. Accordingly, it is possible to retain the lubricant such as grease pushed out from the raceway surface by the cylindrical roller during use of the bearing in this space 30. Thus, the lubricant is prevented from flowing out from the fixing portion 22 or the lip portion 27 of the mandrel 21 of the seal plate 20.

In this embodiment, the whole surface of the fixing portion 22 of the mandrel 21 of the seal plate 20 is coated with the elastic member to completely seal the caulking portion. As a result, the sealing property at the circular groove 10a of the outer ring 10 is improved.

In addition, in the embodiment, the tip surface and the inner circular surface of the bent portion 25 of the mandrel 21 of the seal plate 20 are coated with the elastic member. Accordingly, even when the single-flanged raceway ring 13 or the flange ring 16 is moved in the axial direction or in the radial direction and they are brought in contact with the mandrel 21, the particles due to wear are not produced as compared to the case in which metal surfaces are in contact with each other. Thus, the particles due to wear are not included in the encapsulated grease, and the reduction of the life of the bearing can be prevented.

Figure 3:
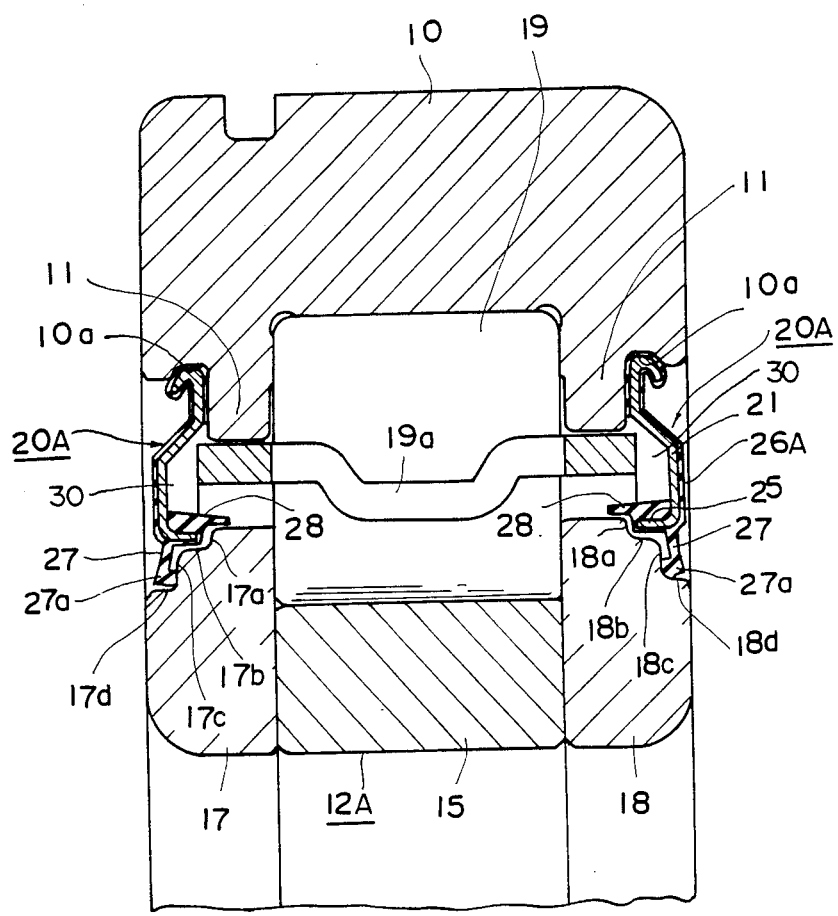
FIGS. 3 to 5 are similar views to FIG. 2 showing respectively different embodiments of the present invention.

FIG. 3 is a longitudinal sectional view of the upper half of the bearing of a second embodiment of the invention.

In this embodiment, an inner ring 12A is constituted by a no-flange raceway ring 15 having no flanges at opposite sides and flange rings 17 and 18 respectively assembled to opposite axial ends of the no-flange raceway ring 15. In the cylindrical outside surfaces of the flange rings 17 and 18, similar to the embodiment of FIG. 2, there are respectively formed end faces 17a and 18a and cutout surfaces 17b and 18b of a first step, and end faces 17c and 18c and cutout surfaces 17d and 18d of a second step.

The configuration and assembled condition of a seal plate 20A is basically identical with the seal plate 20 in FIG. 2. However, an elastic member 26A which is coated on an outer peripheral surface (remote from the axis in Figure) of a bent portion 25 of a mandrel or core 21 extends from a position substantially outside in the radial direction with respect to the bent portion 25 inwardly in the axial direction so that it is extended further beyond the tip surface of the bent portion thereby to form an auxiliary lip portion 28. The inner circular surfaces of both the auxiliary lip portions are respectively positioned close to the cylindrical outside surfaces of the flange rings 17 and 18 with a minute clearance thereby to form sealing portions of the non-contact type.

The remaining parts of the configuration are the same as the embodiment of FIG. 2, and identical reference numerals are used for these parts and the descriptions thereof are omitted.

Where the cylindrical roller bearing in this embodiment is used in the mode in which the inner ring is rotating, the auxiliary lip portions 28 of the seal plates 20 perform the action of guiding the lubricant such as grease or the like existing between the inner circular surface of a retainer 19a and the flange rings 17 and 18 into the inside in the axial direction, and introducing the lubricant between the end faces of a cylindrical roller 19 and the flange faces (roller guiding faces) of the flange rings 17 and 18. Accordingly, the lubricating property is improved to a great extent.

Furthermore, since the inner ring 12A is constituted by the no-flange raceway ring 15 and the two identically-shaped flange rings 17 and 18, the work of the raceway ring 15 is very easy as compared with the inner ring in FIG. 2.

The operation and technical effect other than described above are the same as that of the embodiment of FIG. 2, and thus the descriptions thereof are omitted.

In this respect, the inner ring in the embodiment of FIG. 2 may be constituted by the no-flange ring and the flange rings in the embodiment of FIG. 3, and conversely, the inner ring in the embodiment of FIG. 3 may be constituted by the single-flanged raceway ring and the flange ring in the embodiment of FIG. 2.

In the first and second embodiments described above, the cylindrical roller bearing has the seal plates attached to the outer ring. Conversely, however, the outer ring may be constituted by the single-flanged raceway ring and the flange ring, or the no-flange ring and the flange ring, in which cutout surfaces respectively increasing the diameter in two steps through an end face of a first step and an end face of a second step are formed in each of a cylindrical inside surface at the axial end side of the flange of the single-flanged raceway ring flange and a cylindrical inside surface at the axial end of the flange ring. In addition, a seal plate including a mandrel having a fixing portion and a bent portion, and including a lip portion configured reversed to the above embodiment may be fitted to the inner ring so that the relationships with respect to the outer ring ar similar to the above embodiment. In this case, also, a technical effect similar to that in the above embodiment can be obtained.

Figure 4:
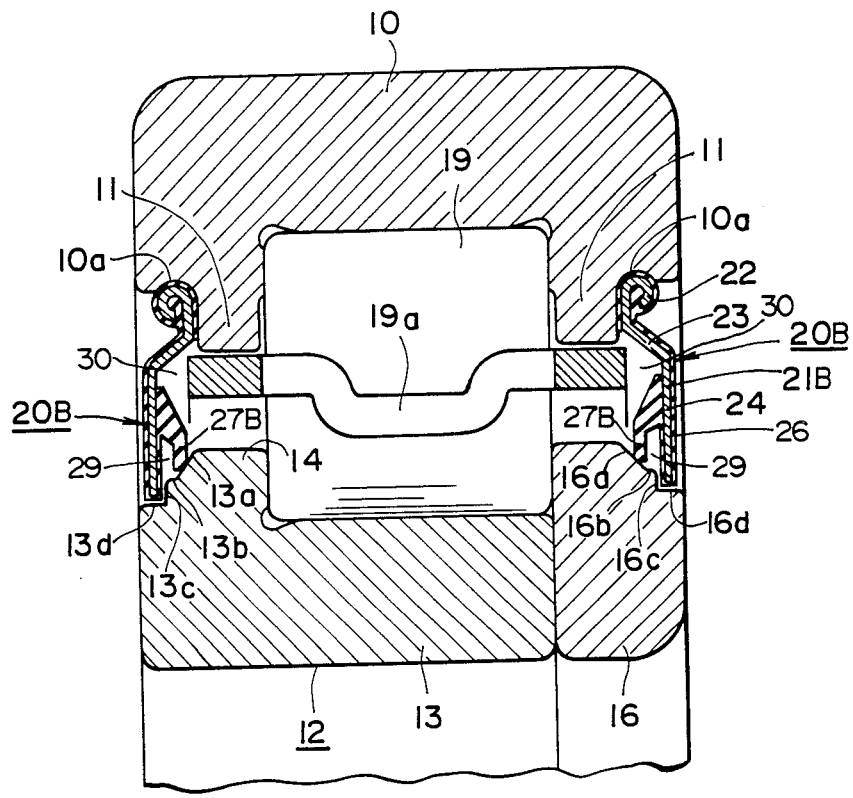

FIG. 4 is a longitudinal sectional view of an upper half of a bearing of a third embodiment of the invention.

In the bearing of this embodiment, an inner ring 12 configured as in FIG. 2 is assembled to an outer ring 10, and the structure of each part except a seal plate 20B and its assembled condition is the same as in the embodiment of FIG. 2, and the description thereof is omitted. The corresponding parts are attached with like reference numerals.

A mandrel or core 21B of the seal plate 20B includes a fixing portion 22 which is curved outwardly in the axial direction, a slant portion 23 which is extended from an inner circular edge of the fixing portion 22 and bent obliquely and outwardly toward the axis, and a circular ring portion 24 which is extended from an inner circular edge of the slant portion 23 perpendicularly toward the axis. An elastic member 26 is bonded to cover both surfaces of the fixing portion 22, an outside surface of the slant portion 23 and the circular ring portion 24, and an inner edge surface and an inside surface of the circular ring portion 24. The elastic member 26 bonded to the inside surface of the circular ring portion 24 extends from the inside surface inwardly to form a thick-walled portion slanted toward the axis, and further extends perpendicularly toward the axis to form a space 29 between the circular ring portion 24 and the extended elastic member 26 to form a lip portion 27B whose extreme end is positioned radially outside with respect to the inner edge of the circular ring portion 24.

The fixing portions 22 of the mandrels 21 of the seal plates 20 are respectively fixed by caulking to circular grooves 10a at right and left sides of the outer ring 10.

In the seal plate 20 at the left axial end, with respect to the single-flanged raceway ring 13, an inside surface of the extreme end (inner edge) of the circular ring portion 24 of the mandrel 21 is positioned close with a minute axial clearance to an end face 13c of a second step, and the extreme end of the circular ring portion 24 is positioned close with a minute radial clearance to a cutout surface 13d of the second step thereby to form a sealing portion of the non-contact type. An edge surface at the axially inside of the end portion of the lip portion 27 is slidingly in contact with an end face 13a (in this embodiment, the end face 13a is a slant face slanted at small angles with respect to the axial direction) of a first step thereby forming a sealing portion of the contact type.

Similarly, in the seal plate 20 at the axial right end, with respect to the flange ring 16, an inside surface and an extreme end surface of the extreme end portion (inner edge) of the circular ring portion 24 of the mandrel 21 are positioned close with a minute clearance respectively to an end face 16c of a cutout surface 16d of a second step, thereby to form a sealing portion of the non-contact type. An inside edge surface of the end portion of the lip portion 27 is slidingly in contact with an end face 16a (in this embodiment, the end face 16a is a slant face slanted at small angles with respect to the axial direction of a first step thereby to form a sealing portion of the contact type.

In the cylindrical roller bearing configured as described above, when the single-flanged raceway ring 13 or the flange ring 16 is moved in the axial direction, the end face 13c of the second step of the single-flanged raceway ring 13 or the end face 16c of the second step of the flange ring 16 abuts against the inside surface of the end portion of the circular ring portion 24 of the mandrel 21 of the corresponding one of the seal plates 20. On the other hand, when the single-flanged raceway ring 13 or the flange ring 16 is moved in the radial direction, the cutout surface 13d of the second step of the single-flanged raceway ring 13 or the cutout surface of the second step of the flange ring portion 16 abuts against the end surface of the circular ring portion 24 of the mandrel 21 of the corresponding one of the seal plates 20. Accordingly, the single-flanged raceway ring 13 or the flanged ring 16 is supported by the mandrel 21 of the seal plate 20 in the axial and radial directions, and the movement in the axial and radial directions exceeding the clearances with respect to the mandrel 21 of the seal plate 20 is interrupted.

In the cylindrical roller bearing having the above-mentioned seal plates 20 assembled thereto, the circular ring portions 24 of the mandrels 21 of the seal plates 20 respectively form the non-contact type sealing portions with respect to the single-flanged raceway ring 13 and the flange ring 16. As a result, the intrusion of foreign substances from the outside of the bearing can be prevented.

Since the inside edge surfaces of the end portions of the lip portions 27 of the seal plates 20 are respectively slidingly in contact with the end face 13a of the first step of the single-flanged raceway ring 13 and the end face 16a of the first step of the flange ring 16, it is possible to prevent the reversal of the end portions of the lip portions 27 and to prevent degradation of the sealing property at the time of assembling the seal plates 20.

Furthermore, since the space 29 is formed between the circular ring portion 24 and the lip portion 27 of the mandrel 21 of each of the seal plates 20, when the bearing is used with the inner ring being rotated, the foreign substances intruded from the outside of the bearing are accumulated in the space by centrifugal force, and the intrusion into the inside of the bearing is prevented.

Moreover, the annular space portion surrounded by the slant portion 23, circular ring portion 24, and the lip portion 27 bonded to the axially inside surface of the circular ring portion 24 forms a space 30 as a grease retainer. Accordingly, the lubricant such as grease or the like pushed out from the cyulindrical roller 19 and the raceway surface is retained in the space 30, and the leakage of the lubricant from the fixing portion 22 and the lip portion 27 of the mandrel 21 of the seal plate 20 is prevented.

In addition, in the embodiment, since the inside surface and the end surface of the extreme end portion (inner edge portion) of the circular ring portion 24 are coated with the elastic member 26, even when the single-flanged raceway ring 13 or the flange ring 16 is moved in the axial direction or the radial direction and brought in contact with the mandrel 21, relatively few particles due to wear, which affect the life of the bearing adversely, are produced as compared with the case wherein metal surfaces are in contact with each other.

The operation and technical effect are the same as the embodiment of FIG. 2 described in the forgoing.

Figure 5:
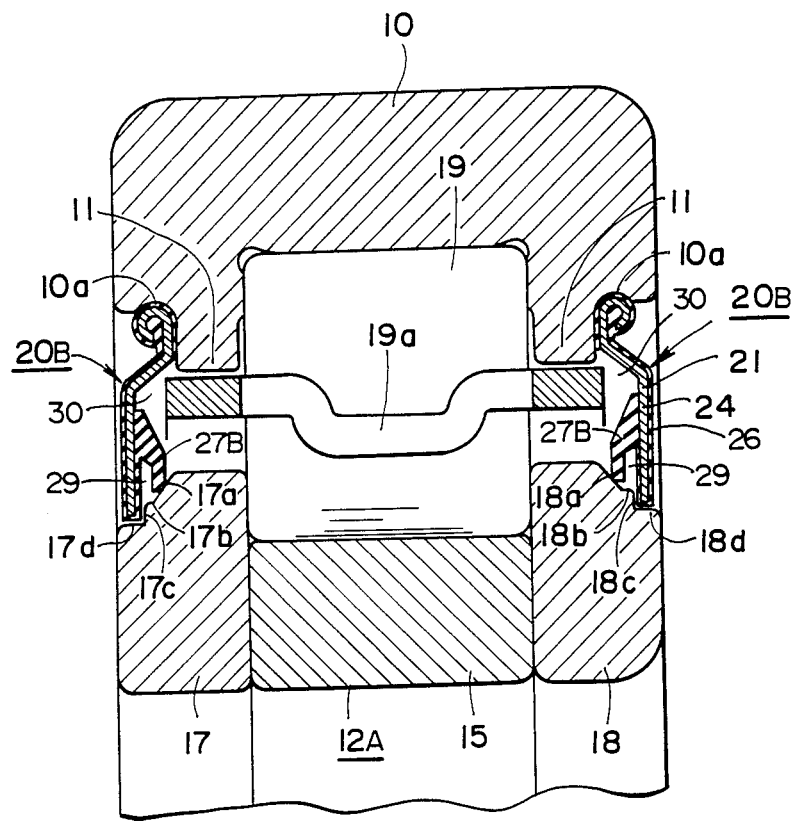

FIG. 5 is a longitudinal sectional view of an upper half of a bearing of a fourth embodiment of the invention.

In this embodiment, an inner ring 12A configured as shown in FIG. 3 is assembled to an outer ring 10. The configuration of a seal plate 20B, and the assembled condition of flange rings 17 and 18 are the same as the seal plate shown in FIG. 4. The operation and technical effect are also the same. Futhermore, the technical effect obtained by constituting the inner ring 12A by a single no-flange raceway ring 15 and two identically-shaped flange rings 17 and 18 is the same as the embodiment of FIG. 3, and identical reference numerals are used for identical parts and repetitious descriptions thereof are omitted.

Furthermore, as regard the shape of the cylindrical outside surface of the flange of the single-flanged raceway ring and that of the flange ring in the embodiments in FIGS. 4 and 5, instead of forming the cutout surface of the first step, the end face of the second step may be formed continuously with the slant surface of the first step.

In addition, the lip portion of the seal plate may be formed in a shape in which the lip portion extends obliquely and inwardly in the axial direction.

In the embodiments in FIGS. 4 and 5, the cylindrical roller bearings are described in which the seal plates are fixed to the outer ring. Conversely, however, the circular grooves for fitting the seal plates may be formed in the inner ring, and the outer ring may be constituted by the single-flanged raceway ring and the flange ring, or by the no-flange raceway ring and the flange ring. In the above configuration, a slant surface or an end face of a first step and a cutout surface, formed by increasing a diameter through an end face of a second step which is connected to the slant surface or the end face of the first step, are formed in a cylindrical inside surface at an axial end side of the flange of the raceway ring having the single flange, and in a cylindrical inside surface at the axial end side of the flange ring. Further, a seal plate including a mandrel having a fixing portion, slant portion, circular ring portion, and lip portion of an elastic member formed in reverse to that in the above-mentioned embodiment may be fitted to each side of the inner ring so that the fixing position with respect to the outer ring is in a similar relationship as in the above-mentioned embodiment. In such a configuration, similar operation and technical effect to the above-mentioned embodiment can be obtained.

In the first to fourth embodiments, the seal plates are fitted to both right and left axial end portions of the bearing. However, the present invention can be applied to these cases in which the seal plate is fitted to either one axial end portion depending on operating conditions, such as a type of a machine and apparatus to which the bearing is to be attached, a fixing position of the bearing, and the like.

In the present invention, the single-flanged raceway ring or the flange ring of the sealed non-separable cylindrical roller bearing is supported by the bent portion or the circular ring portion of the mandrel in the axial direction and in the radial direction. Accordingly, even when the single-flanged raceway ring or the flange ring is moved in the axial and radial directions during transportation, the lip portion of the seal plate is not subjected to a large external force or shock. Thus, the lip portion is not damaged or worn and is also prevented from being deformed plastically. By virtue of this, the sealing function of the seal plate is not spoiled during transportation without requiring the use of any special fixing jig, thereby simplifying the handling during transportation.

Furthermore, in the present invention, also during use, the movement of the single-flanged raceway ring or the flange ring in the axial and radial directions is restricted by the bent portion or the circular ring portion of the mandrel. As a result, the surface pressure of the lip portion becomes low and the amount of war of the lip portion becomes very small, and the sealing effect can be maintained for a long time.

What is claimed is:

1. In a sealed cylindrical roller bearing including an outer ring having flanges at axial opposite ends, an inner ring having flanges at axial opposite ends, cylindrical rollers interposed rollably between said outer ring and said inner ring, and a seal plate fixed to at least one axial end of said outer ring or said inner ring, the improvement comprising:

one of said outer and inner rings including a combination of a raceway ring and at least one flange ring;

said seal plate, fixed to one of said outer and inner rings, including a mandrel having a fixing portion, a slant portion extending from said fixing portion by bending obliquely and outwardly in an axial direction, an intermediate portion extending from said slant portion perpendicularly to an axis of said bearing, and a bent portion extending from said intermediate portion inwardly in the axial direction, said seal plate having a lip portion formed of an elastic member bonded integrally to said mandrel and extending in an opposite direction to said fixing portion from said bent portion starting from a position axially outside with respect to a tip portion of said bent portion;

an axial end portion of at least one flange having a step-formed portion with an end face and a cutout surface of a first step and an end face of a second step contiguous to said cutout surface of said first step in the axially outside direction; and said bent portion of the mandrel of said seal plate positioned close to said end face and said cutout face of the first step with a minute axial clearance and a minute radial clearance, and a side surface of the tip portion of said lip portion of said seal plate positioned slidingly in contact with said end face of said second step formed in said axial end portion.

2. The sealed cylindrical roller bearing according to claim 1, wherein the raceway ring and at least one flange ring comprise the combination of a no-flange raceway ring and two flange rings.

3. The sealed cylindrical roller bearing according to claim 2, wherein the whole surface of said fixing portion of the mandrel of said seal plate is coated with the elastic member.

4. The sealed cylindrical roller bearing according to claim 1, wherein the raceway ring and at least one flange ring comprise the combination of a single-flanged raceway ring and a flange ring.

5. The sealed cylindrical roller bearing according to claim 4, wherein the whole surface of said fixing portion of the mandrel of said seal plate is coated with the elastic member.

6. The sealed cylindrical roller bearing according to claim 1, wherein said mandrel of said seal plate further comprises an auxiliary lip portion formed of an elastic member bonded to an outer surface of said bent portion opposite to said lip portion and extending inwardly in the axial direction beyond the tip portion of said lip portion, and said auxiliary lip portion positioned close to a cylindrical surface of said at least one flange.

7. The sealed cylindrical roller bearing according to claim 6, wherein the whole surface of said fixing portion of the mandrel of said seal plate is coated with the elastic member.

8. The sealed cylindrical roller bearing according to claim 6, wherein a surface of the tip portion of said bent portion and a peripheral surface of said lip portion of the mandrel of said seal plate are respectively coated with the elastic member.

9. The sealed cylindrical roller bearing according to claim 8, wherein the tip portion of said lip portion of said seal plate is formed by a thick wall thicker than the rest portion.

10. The sealed cylindrical roller bearing according to claim 9, wherein the whole surface of said fixing portion of the mandrel of said seal plate is coated with the elastic member.

11. The sealed cylindrical roller bearing according to claim 9, wherein an annular portion surrounded by said slant portion, said intermediate portion, and said bent portion of the mandrel of said seal plate forms a space for reserving grease.

12. The sealed cylindrical roller bearing according to claim 11, wherein the whole surface of said fixing portion of the mandrel of said seal plate is coated with the elastic member.

13. The sealed cylindrical roller bearing according to claim 8, wherein an annular portion surrounded by said slant portion, said intermediate portion, and said bent portion of the mandrel of said seal plate forms a space for reserving grease.

14. The sealed cylindrical roller bearing according to claim 13, wherein the whole surface of said fixing portion of the mandrel of said seal plate is coated with the elastic member.

15. The sealed cylindrical roller bearing according to claim 8, wherein the whole surface of said fixing portion of the mandrel of said seal plate is coated with the elastic member.

16. The sealed cylindrical roller bearing according to claim 6, wherein an annular portion surrounded by said slant portion, said intermediate portion, and said bent portion of the mandrel of said seal plate forms a space for receiving grease.

17. The sealed cylindrical roller bearing according to claim 16, wherein the whole surface of said fixing portion of the mandrel of said seal plate is coated with the elastic member.

18. The sealed cylindrical roller bearing according to claim 1, wherein annular portion surrounded by said slant portion, said intermediate portion, and said bent portion of the mandrel of said seal plate forms a space for reserving grease.

19. The sealed cylindrical roller bearing according to claim 18, wherein the whole surface of said fixing portion of the mandrel of said seal plate is coated with the elastic member.

20. The sealed cylindrical roller bearing according to claim 1, wherein the whole surface of said fixing portion of the mandrel of said seal plate is coated with the elastic member.

21. In a sealed cylindrical roller bearing including an outer ring having flanges at axial opposite ends, an inner ring having flanges at axial opposite ends, cylindrical rollers interposed rollably between said outer ring and said inner ring, and a seal plate fixed to at least one axial end of said outer ring or said inner ring, the improvement comprising:

one of said outer and inner rings including a combination of a raceway ring and at least one flange ring;

said seal plate, fixed to one of said outer and inner rings, including a mandrel having a fixing portion, a slant portion extending from said fixing portion by bending obliquely and outwardly in an axial direction, a circular ring portion extending from said slant portion perpendicularly to an axis of said bearing, said seal plate further including a lip portion formed of an elastic member bonded integrally to said mandrel and extending in an opposite direction to said fixing portion from an inner side surface of said circular ring portion forming a space between said inner side surface and the lip portion;

an axial end portion of said at least one flange having a step-formed portion with an end face of a first step and an end face and a cutout surface of a second step contiguous to said end surface of said first step in the axially outside direction; and a side surface of the tip portion of said lip portion of the mandrel of said seal plate positioned slidingly in contact with said end face of the first step, and an inner edge portion of said circular ring portion of the mandrel of said seal plate positioned close to said end face and said cutout surface of the second step with a minute axial clearance and a minute radial clearance.

22. The sealed cylindrical roller bearing according to claim 21, wherein an inner side surface and an end surface of the inner edge portion of said circular ring portion of the mandrel of said seal plate are respectively coated with the elastic member.

23. The sealed cylindrical roller bearing according to claim 22, wherein an annular portion surrounded by said slant portion, said circular ring portion, and said lip portion of the elastic member forms a space for receiving grease.

24. The sealed cylindrical roller bearing according to claim 23, wherein the whole surface of said fixing portion of the mandrel of said seal plate is coated with the elastic member.

25. The sealed cylindrical roller bearing according to claim 22, wherein the whole surface of said fixing portion of the mandrel of said seal plate is coated with the elastic member.

26. The sealed cylindrical roller bearing according to claim 6, wherein an annular portion surrounded by said slant portion, said circular ring portion, and said lip portion of the elastic member forms a space for reserving grease.

27. The sealed cylindrical roller bearing according to claim 26, wherein the whole surface of said fixing portion of the mandrel of said seal plate is coated with the elastic member.

28. The sealed cylindrical roller bearing according to claim 21, wherein the raceway ring and at least one flange ring comprise the combination of a single-flanged raceway ring and a flange ring.

29. The sealed cylindrical roller bearing according to claim 28, wherein the whole surface of said fixing portion of the mandrel of said seal plate is coated with the elastic member.

30. The sealed cylindrical roller bearing according to claim 21, wherein the raceway ring and at least one flange ring comprise the combination of a no-flange raceway ring and two flange rings.

31. The sealed cylindrical roller bearing according to claim 30, wherein the whole surface of said fixing portion of the mandrel of said seal plate is coated with the elastic member.

32. The sealed cylindrical roller bearing according to claim 21, wherein the whole surface of said fixing portion of the mandrel of said seal plate is coated with the elastic member.

* * * * *